United States Patent
Cho et al.

(10) Patent No.: US 11,315,038 B2
(45) Date of Patent: Apr. 26, 2022

(54) METHOD TO MEASURE SIMILARITY OF DATASETS FOR GIVEN AI TASK

(71) Applicant: INTERNATIONAL BUSINESS MACHINES CORPORATION, Armonk, NY (US)

(72) Inventors: Minsik Cho, Austin, TX (US); Frank Liu, Austin, TX (US); Inseok Hwang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 16/413,702

(22) Filed: May 16, 2019

(65) Prior Publication Data

US 2020/0364611 A1 Nov. 19, 2020

(51) Int. Cl.
*G06N 20/00* (2019.01)
*G06F 16/583* (2019.01)

(52) U.S. Cl.
CPC ........... *G06N 20/00* (2019.01); *G06F 16/583* (2019.01)

(58) Field of Classification Search
CPC .............................. G06N 20/00; G06F 16/583
See application file for complete search history.

(56) References Cited

U.S. PATENT DOCUMENTS

| | | | |
|---|---|---|---|
| 10,248,653 B2 | 4/2019 | Blassin et al. | |
| 10,504,005 B1 * | 12/2019 | Walters | G06N 3/08 |
| 11,042,586 B2 * | 6/2021 | Hohwald | G06F 3/04817 |
| 2014/0079297 A1 * | 3/2014 | Tadayon | G06V 40/172 382/118 |
| 2015/0339543 A1 * | 11/2015 | Campanelli | H04N 19/136 382/182 |
| 2016/0155136 A1 | 6/2016 | Zhang et al. | |
| 2017/0161635 A1 | 6/2017 | Oono et al. | |
| 2019/0138853 A1 * | 5/2019 | Goncalves | G06N 3/088 |
| 2020/0219245 A1 * | 7/2020 | Doggett | G06K 9/00718 |

OTHER PUBLICATIONS

P Karr. et al.;"Supervised Learning with Similarity Functions",Microsoft, 2012.
Chechik, G. et al.;"Large Scale Online Learning of Image Similarity Through Ranking",LNCS, vol. 5524. 2009.
Anonymous, "A Method to Intelligently Recognize, Interact and Fulfill Business Requests in Emails" IPCOM000253683D, Apr. 23, 2018, 12 pages.
IBM, "Content-similarity guided decision support in healthcare" IPCOM000176158D, Nov. 6, 2008, 14 pages.

* cited by examiner

*Primary Examiner* — Beau D Spratt
(74) *Attorney, Agent, or Firm* — Stephen R. Yoder

(57) ABSTRACT

A computer-implemented method comprises: inputting into an autoencoder sets of input samples, each of the sets of input samples comprising: a reference input sample of a reference dataset and one or more target input samples of one or more target datasets, the autoencoder being trained using the reference dataset. The autoencoder generates a respective set of outputs for each set of the input samples to thereby form one or more respective sets of outputs, each of the one or more sets of outputs comprising the reference output and the one or more target outputs for a respective set of input samples; and determining the similarity of each of the one or more target datasets to the reference dataset by comparing each of the one or more target outputs to respective target input samples of each of the sets of input samples.

20 Claims, 14 Drawing Sheets

METHOD TO MEASURE SIMILARITY OF DATASETS FOR GIVEN AI TASK

BACKGROUND

The present invention relates to measuring the similarity of datasets.

SUMMARY

According to an embodiment of the present invention, the present invention provides a computer-implemented method comprising: inputting into an autoencoder one or more sets of input samples, each of the one or more sets of input samples comprising: a reference input sample of a reference dataset and one or more target input samples of one or more target datasets, the autoencoder being trained using the reference dataset; for each set of input samples: encoding by the autoencoder a latent space representation of the reference input sample based on the reference input sample; reconstructing by the autoencoder the latent space representation of the reference input sample to thereby generate a reference output; encoding by the autoencoder a latent space representation of each target input sample of the one or more target input samples based on the one or more target input samples; and reconstructing by the autoencoder the latent space representation of each of the one or more target input samples to thereby generate one or more target outputs; whereby the autoencoder generates a respective set of outputs for each set of the one or more sets of input samples to thereby form one or more respective sets of outputs, each of the one or more respective sets of outputs comprising the reference output and the one or more target outputs for a respective set of input samples; and determining a similarity of each of the one or more target datasets to the reference dataset by comparing each of the one or more target outputs of each of the one or more respective sets of outputs to respective target inputs for each set of the one or more sets of input samples.

Higher similarity between the target inputs and the respective target outputs imply higher similarity between the target inputs and the reference dataset. Lower similarity between the target inputs and the respective target outputs imply lower similarity between the target inputs and the reference dataset. Other embodiments of the present invention include a system for implementing the above-described computer-implemented method and a computer program product comprising one or more computer readable storage devices and program instructions stored on the one or more computer readable storage devices, the stored program instructions comprising: program instructions for implementing the above-described computer-computer-implemented method.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
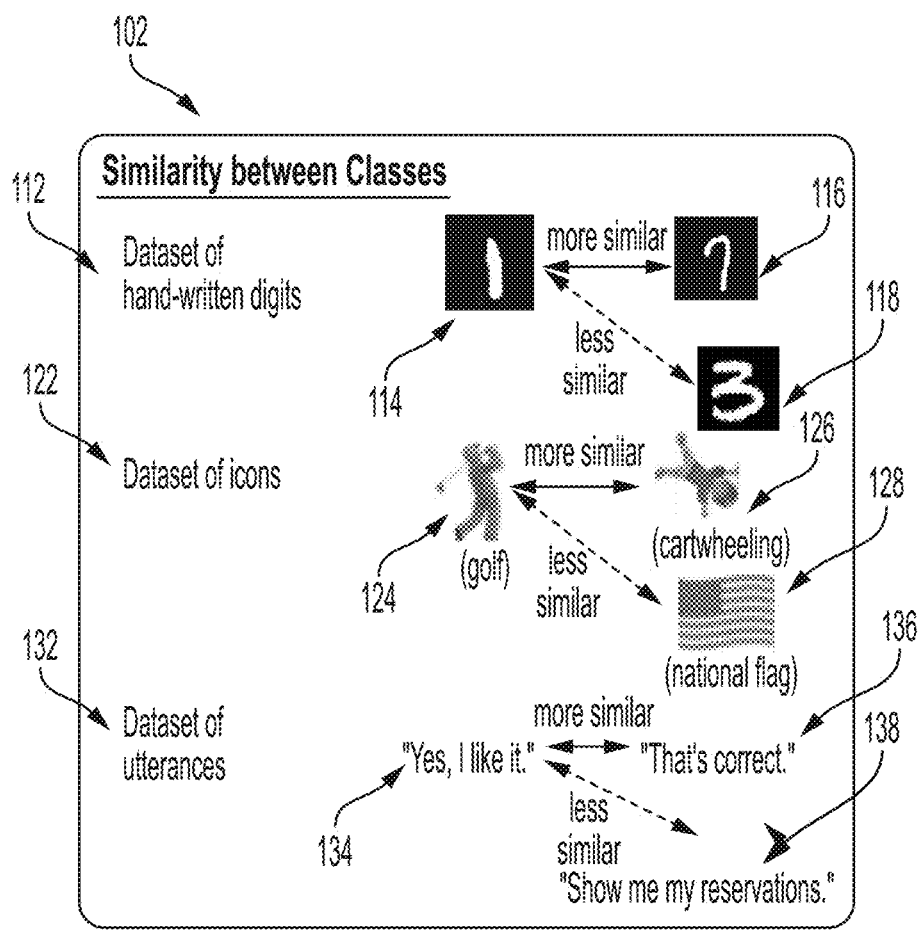
FIG. 1 depicts a diagram illustrating similarity between classes of datasets.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In an embodiment, the present invention provides a method to evaluate the data similarity between two datasets with respect to a given model. An unsupervised network is used to provide numerical metric of data similarity. If a certain model is considered, a part of the model is used as a front-end of the unsupervised network.

With reference now to FIG. 1, FIG. 1 depicts similarity between classes of datasets in a diagram 102. Example 112 of diagram 102 shows similarity between images of handwritten digits for a dataset of hand-written digits. In Example 112, image 114 of a reference hand-written digit, i.e., the number "1", is more similar to image 116 of a target handwritten digit, i.e. the number "7" and less similar to image 118 of a third handwritten digit, i.e., the number "3". Example 122 of diagram 102 shows similarity between images of hand-written digits. Example 122 of diagram 102 shows similarity between images of icons for a dataset of icons. In Example 122, image 124 of a reference icon, i.e., an icon of a person playing golf is more similar to image 126 of a target icon of a child cartwheeling and less similar to image 128 of an icon representing a national flag, i.e., the flag of the United States. Example 132 of diagram 102 shows similarity between utterances for a dataset of utterances. In Example 132, utterance 134 of "Yes, I like it." is more similar to utterance 136 of "That's correct" and less similar to utterance 138 of "Show me my reservations."

Figure 2:
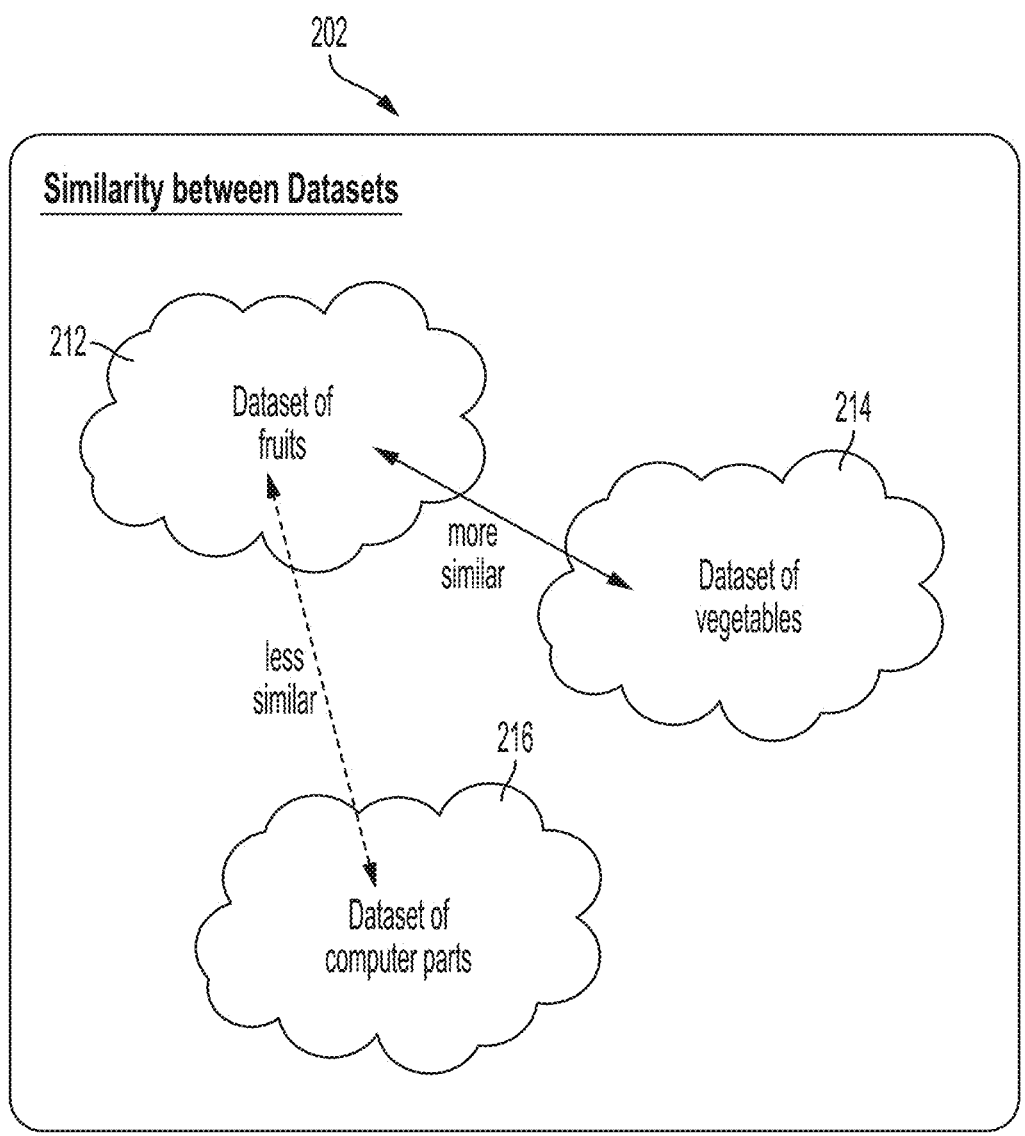
FIG. 2 depicts a diagram illustrating similarity between datasets.

FIG. 2 depicts similarity between datasets in a diagram 202. In diagram 202, a dataset 212 of fruits is more similar to a dataset 214 of vegetables and less similar to a dataset 216 of computer parts.

Figure 3:
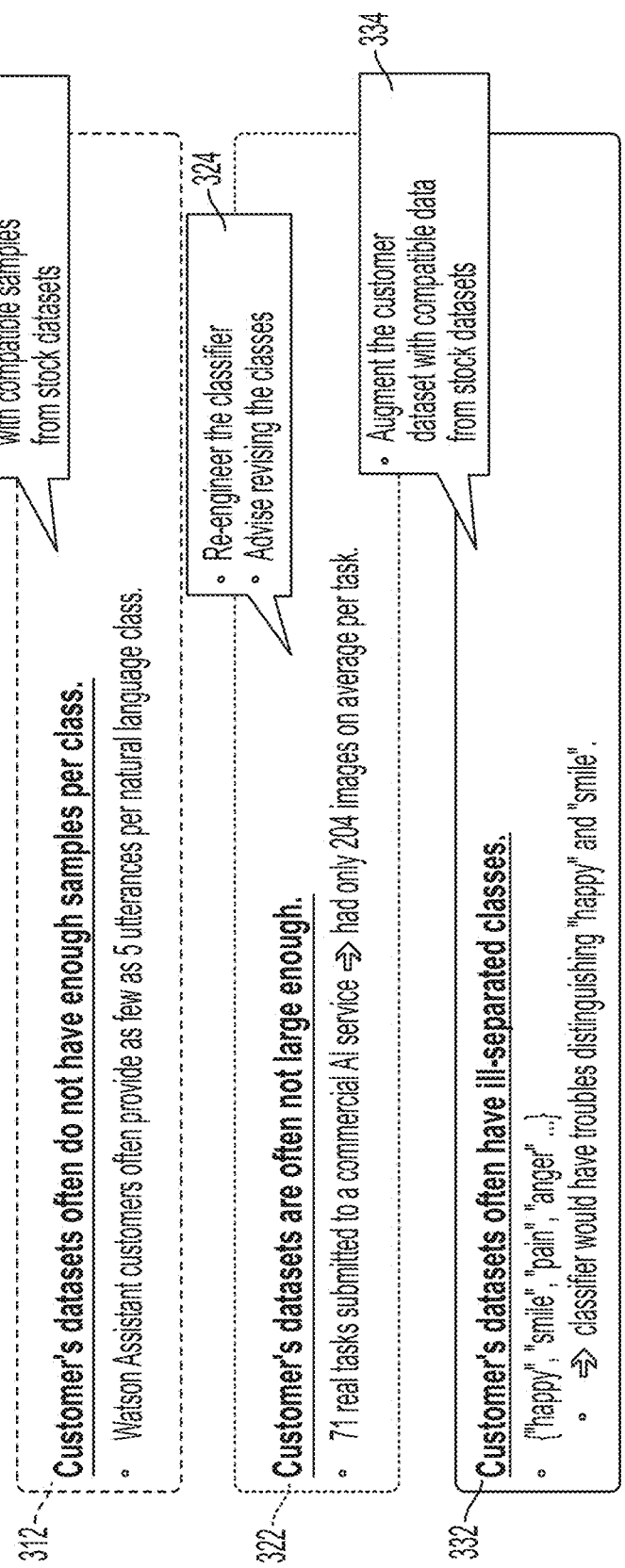
FIG. 3 depicts a diagram illustrating why transfer learning and data similarity are important in artificial intelligence (AI) applications according to various embodiments of the present invention.

FIG. 3 depicts examples of why transfer learning and data similarity are important in artificial intelligence (AI) applications, such as speech recognition. For example, as described in box 312, a customer's set of datasets often do not have enough samples per class. For example, Watson Assistant customers often provide relatively few utterances, i.e., speech dataset samples. According to an embodiment of the present invention, a hungry class of datasets, i.e., a class of datasets having relatively few samples, may be supplemented with compatible samples from stock datasets that are highly similar to the hungry class of datasets as shown at comment box 314. As described in box 322, a customer's datasets are often not large enough. For example, for 71 real tasks submitted to a commercial AI service, there may only 204 images on average per task. In such a case, the classifier may be re-engineered and it may be advisable to revise the classes as shown at comment box 324. As described in box 332, a customer's datasets often have ill-separated classes. For example, for a dataset such as "happy", "smile", "pain", "anger", etc. the classifier may have trouble distinguishing "happy" and "smile". In such a situation, the customer dataset may be augmented with compatible data from stock dataset as shown in comment box 334.

Figure 4:
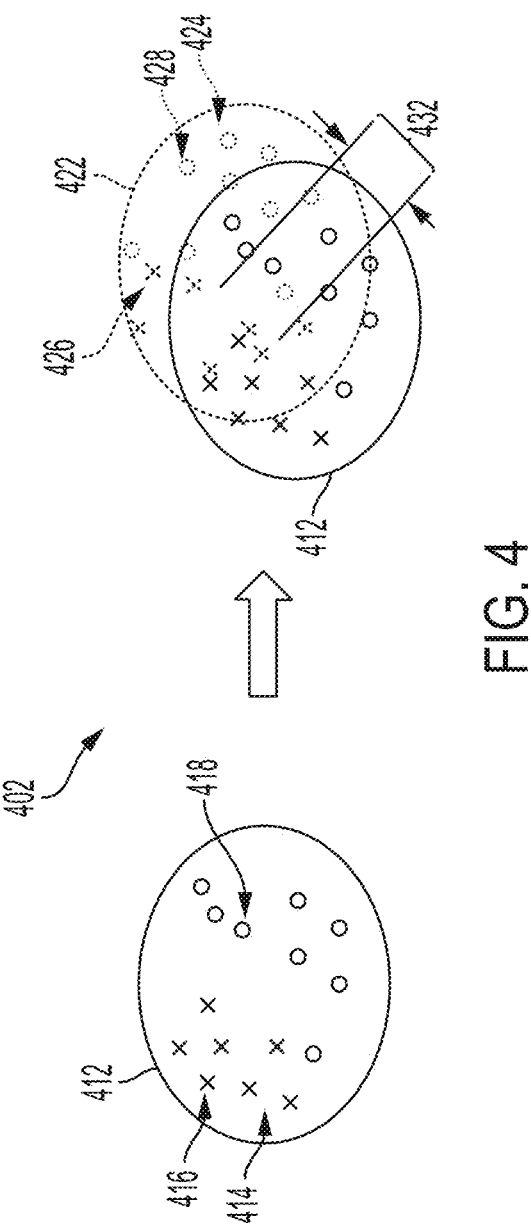
FIG. 4 depicts a diagram illustrating a data similarity metric between two datasets.

FIG. 4 depicts measuring the similarity of datasets. In diagram 402 of FIG. 4 an original dataset 412 has an original distribution of data 414, shown by the x's 416 and o's 418 in original dataset 412, in comparison to a new dataset 422 that has a new data distribution 424, shown by the x's 426 and o's 428 in dataset 422. Also, shown in diagram is a data similarity metric 432 between new dataset 422 and original dataset 412. By measuring the "similarity" of the datasets used, it is possible to have a better answer to the questions of "What to transfer data?" and "How to transfer data?" between datasets, as well as the question of "How effective such a transfer of data will be?" Determining the answers to such questions are an open problem in the AI community. There is also the potential of a significant business if a consistent metric could be identified for the similarity between datasets. For example, a consistent metric for dataset similarity would have applications in at least the following: (1) composable AI, (2) guiding data selection for enterprise customers and € provenance tracking of AI models by deploying data similarity on a permissioned ledger.

Figure 5:
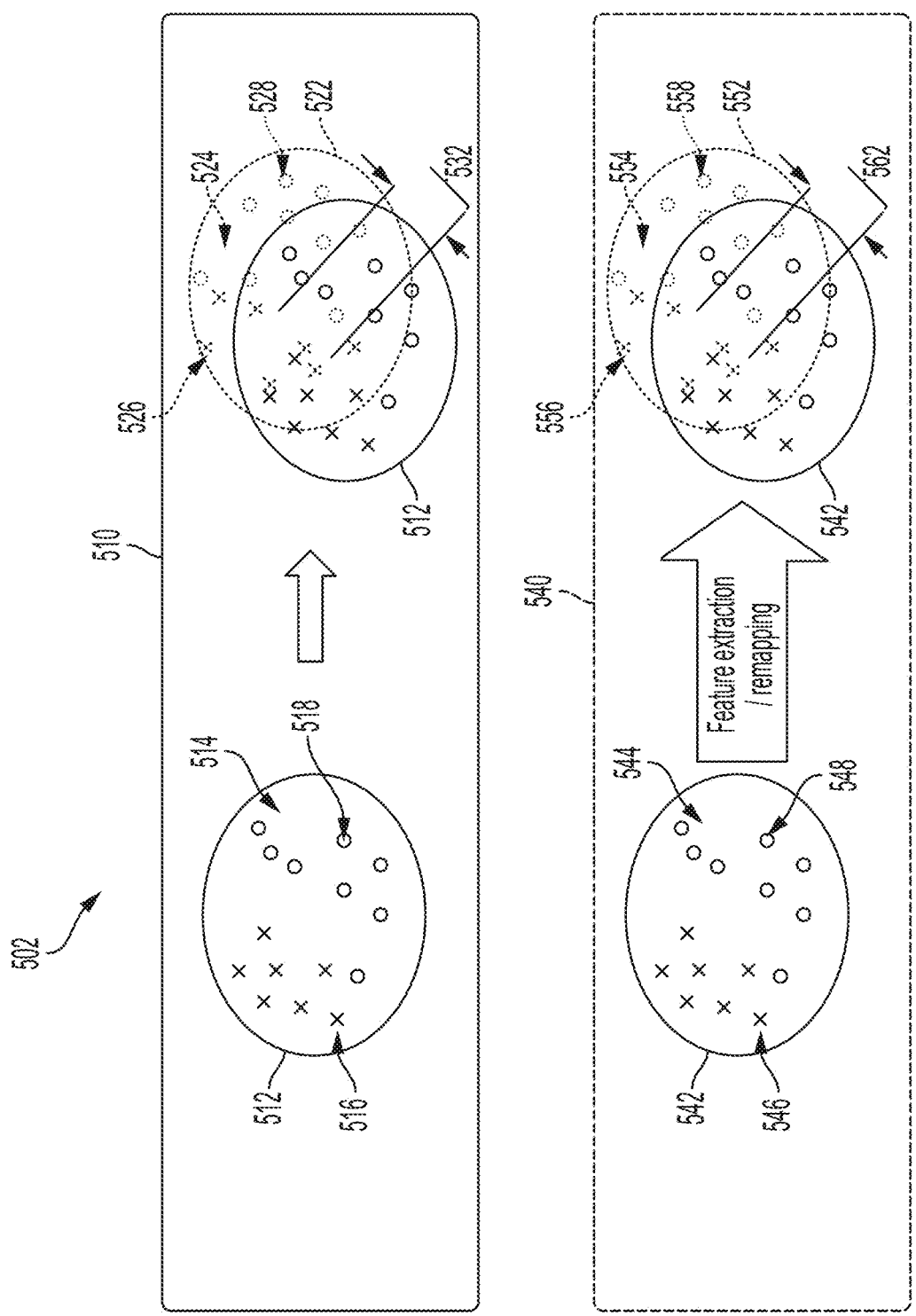
FIG. 5 depicts a diagram illustrating common approaches to measuring data similarity between datasets.

FIG. 5 depicts a diagram 502 illustrating common approaches to measuring data similarity between datasets. Box 510 shows similarity measures in original sample space, i.e., the space that can be observed as inputs or outputs of a conventional AI model. In box 510 an original dataset 512 has an original distribution of data 514, shown by the x's 516 and o's 518 in original dataset 512, in comparison to a new dataset 522 that has a new data distribution 524, shown by the x's 526 and o's 528 in new dataset 522. Also, shown in diagram is a data similarity metric 532 between new dataset 522 and original dataset 512. Box 540 shows similarity measures in latent space, i.e., the "hidden" space in an AI model where similar data points are closer together In box 540 an original dataset 542 has an original distribution of data 544, shown by the x's 546 and o's 548 in original dataset 542, in comparison to a new dataset 562 that has a new data distribution 564, shown by the x's 566 and o's 568 in new dataset 562. Also, shown in diagram is a data similarity metric 572 between new dataset 562 and original dataset 542.

Figure 6:
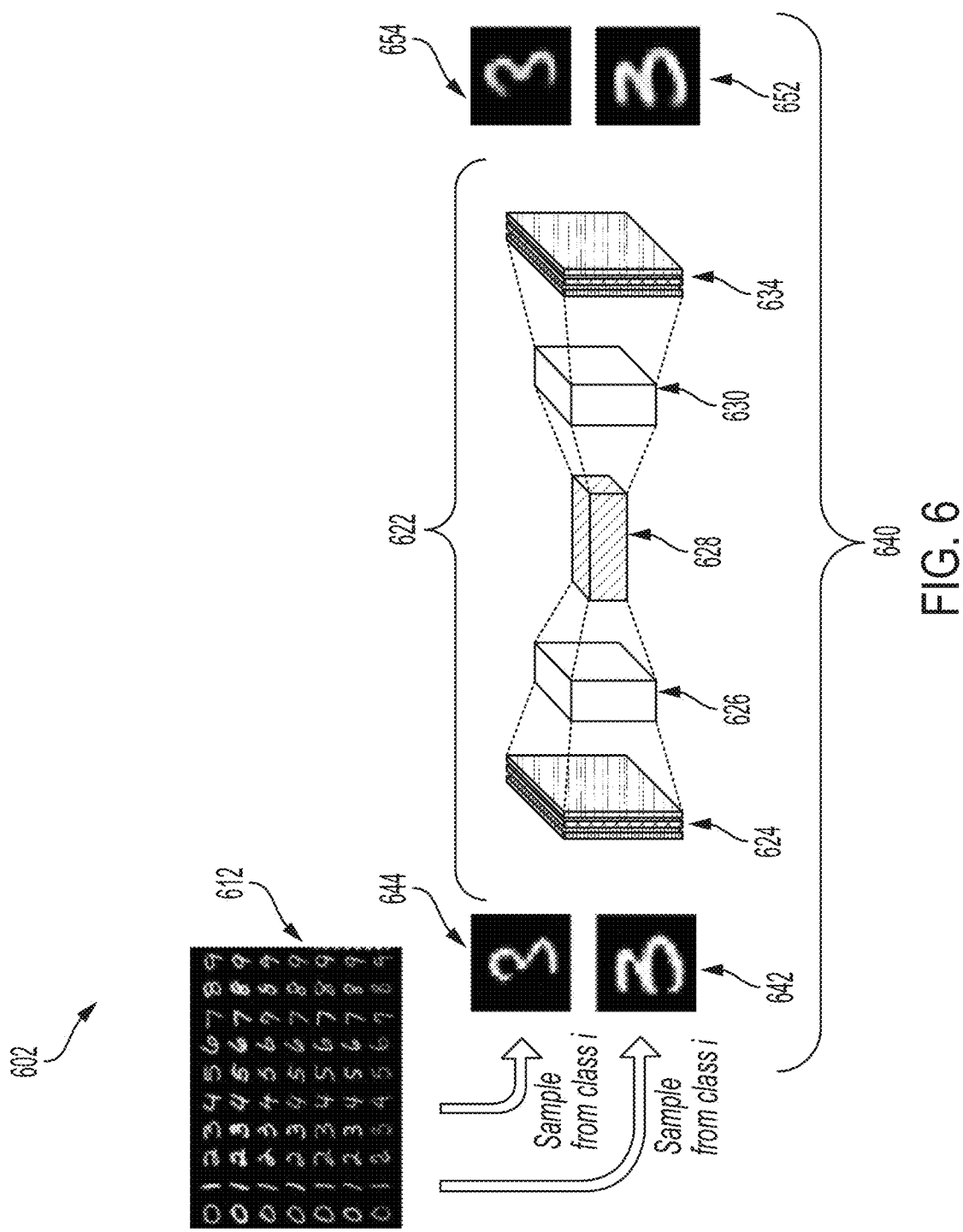
FIG. 6 depicts a diagram illustrating end-to-end data similarity extraction method according to an embodiment of the present invention.

FIG. 6 depicts a diagram 602 illustrating end-to-end data similarity extraction method according to an embodiment of the present invention. In FIG. 6, a dataset 612 of images handwritten numbers 0 through 9. There are ten classes in dataset 612, one class for the images of each number 0 through 9. In the embodiment of the invention shown in FIG. 6, one autoencoder is trained for each one of the ten classes. Each of the ten autoencoders has seen only samples from one of the ten classes. For some purposes of the present invention, the ten classes may be considered as ten different "datasets" of dataset 612. For example, FIG. 6 shows an autoencoder 622 that has only seen samples from class i, of dataset 612 i.e., samples of handwritten number 3's. In autoencoder 622, an input image 642 and an input image 644 are input to input layer 624. Input images at the input layer 624 are encoded into a latent space image at 628. Latent space image 628 is reconstructed at output layer 634 to a reconstructed image 652 and 654, respectively. Diagram 602 shows how in a process 640, a set of image samples, i.e., image sample 642 and image sample 644 from class i of dataset 612 are each input to the input layer 624 into the autoencoder 622. Autoencoder 622 then encodes a latent space representation (not shown) of image sample 642 and encodes a latent space representation (not shown) of image sample 644. The latent space representation of image sample 642 is reconstructed by autoencoder 622 to output a reconstructed image 652 for image sample 642. Also, the latent space representation of image sample 644 is reconstructed by autoencoder 622 to output a reconstructed image 654 for image sample 644. The embodiment of the present invention shown in FIG. 6, allows all of the autoencoders used to be trained in parallel and is also extremely scalable. In one embodiment of the present invention, ten autoencoders could each be trained with one handwritten number class of the Modified National Institute of Standards and Technology database (MNIST database) of handwritten digits, a large database of handwritten digits that is commonly used for training various image processing systems.

Figure 7:
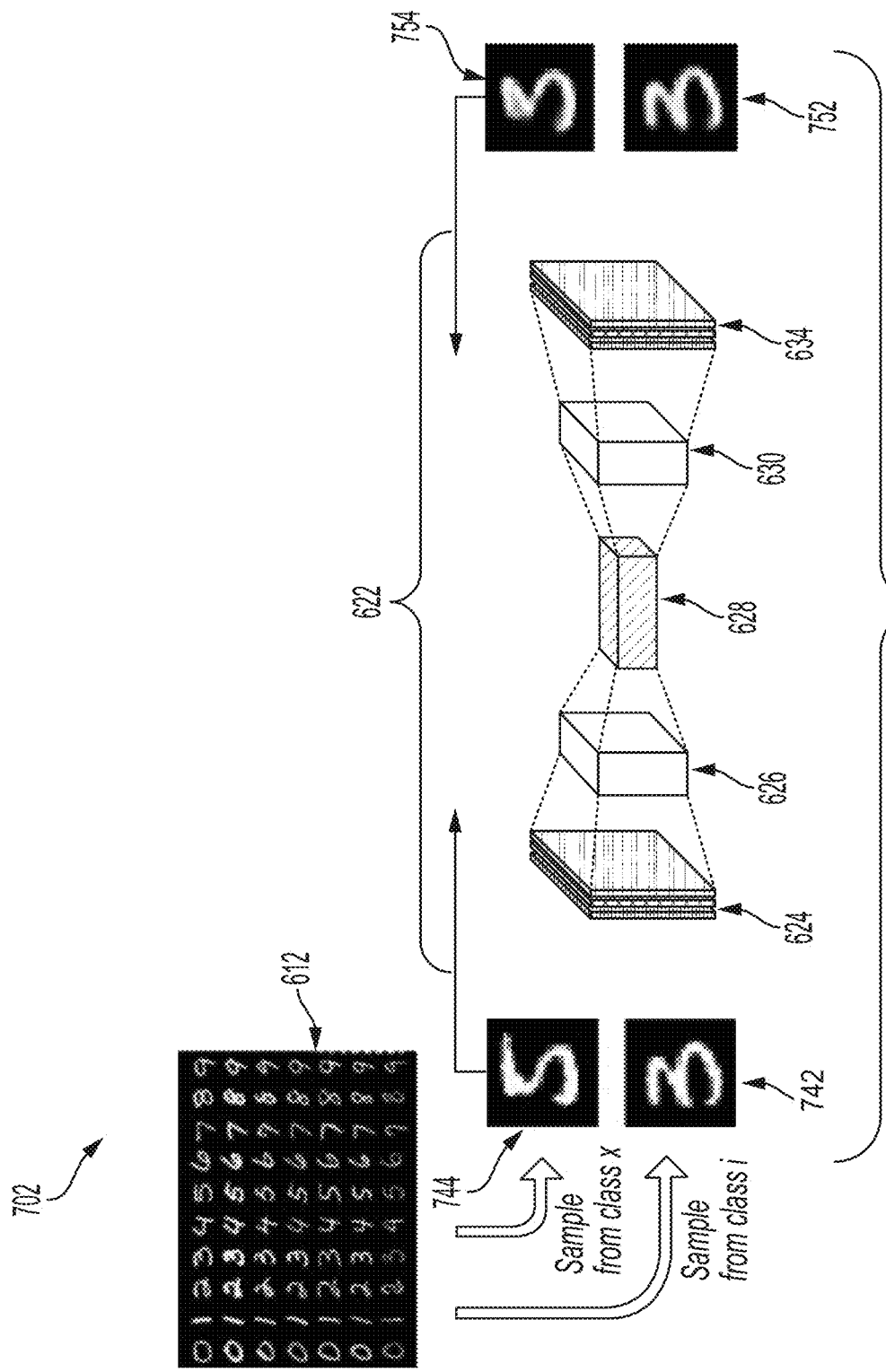
FIG. 7 depicts a diagram illustrating end-to-end data similarity extraction according to an embodiment of the present invention.

FIG. 7 depicts a diagram 702 illustrating end-to-end data similarity extraction according to an embodiment of the present invention. The embodiment of the present invention shown in FIG. 7 employs the dataset 612 and autoencoder 622 shown in FIG. 6. The "reference class" refers to the class of a dataset that an autoencoder, such as autoencoder 622 is trained on. In the case of autoencoder 622, the reference class is handwritten number 3's. The "target class" is the class of the dataset whose similarity is being compared to the reference class. For some purposes of the present invention, the ten classes may be considered as ten different "datasets" of dataset 612. Diagram 702 shows how in process 740 a set of image samples, i.e., a reference input image sample 742 from reference class i (handwritten number 3's) of dataset 612 and a target input image sample 744 from target class x (handwritten number 5's) of dataset 612 are each input to input layer 624 into autoencoder 622. Autoencoder 622 then encodes a latent space representation (not shown) of reference input image sample 742 and encodes a latent space representation (not shown) of target input image sample 744. The latent space representation of reference input image sample 742 is reconstructed by autoencoder 622 to output a reconstructed reference image 752 for reference input image sample 742. Also, the latent space representation of target input image sample 744 is reconstructed by autoencoder 622 to output a reconstructed target image output 754 for target input image sample 744. The similarity of reconstructed target image output 754 to target input image sample 744 can then be compared in a quantitative fashion using any of several techniques, such as by a pixel-by-pixel comparison to measure quantitatively the similarity between the reconstructed target image output 754 to target input image sample 744. Other techniques for measuring quantitatively the similarity between the reconstructed target image output 754 to target input image sample 744 may include techniques such as but not limited to: binary cross entropy, color histograms, cosine similarity, SIFT features, SURF features, or ORB features, etc. By repeating process 740 for other sets of image samples that include a reference image sample from class i and a target image sample from class x, it is possible to quantitatively measure the similarity between class x and class i of dataset 612.

Although in the embodiment of the invention shown in FIG. 7, each set of input samples include a single target image sample, in other embodiments of the present invention, the set of input samples may include two or more target image samples from the same of different classes. In such a case the reconstructed target images for each of the target image samples would be compared to the input image of the target image sample to determine the similarity between the class of each target image sample and the class of the reference image sample.

Figure 8:
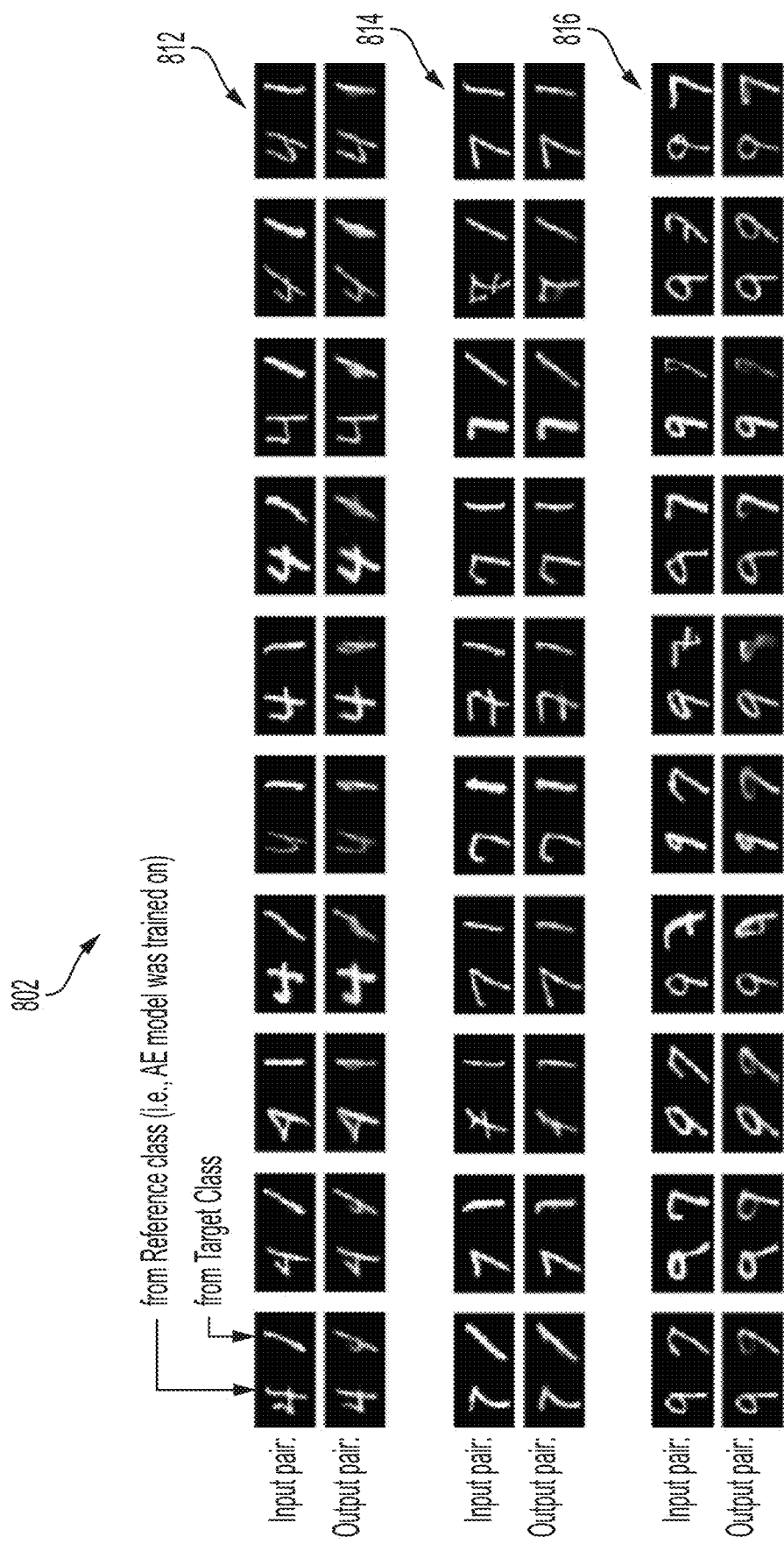
FIG. 8 depicts a diagram illustrating input pairs of images and output pairs of images for a reference class of symbols and a target class of symbols for an autoencoder where the target class of symbols has a high similarity with the reference class of symbols according to an embodiment of the present invention.

FIG. 8 depicts a diagram 802 showing input pairs of images and output pairs of images for a reference class of symbols and a target class of symbols for an autoencoder using a process similar to process 740 of FIG. 7 where the target class of symbols has a high similarity with the reference class of symbols according to an embodiment of the present invention. Example 812 of diagram 802 shows input pairs (sets) of images for an autoencoder where the reference class is images of handwritten 4's and the target class is images of handwritten 1's. Example 814 of diagram 802 shows input pairs (sets) of images for an autoencoder where the reference class is images of handwritten 7's and the target class is images of handwritten 1's. Example 816 of diagram 802 shows input pairs (sets) of images for an autoencoder where the reference class is images of handwritten 9's and the target class is images of handwritten 7's. The interpretation of examples 812, 814 and 816 is that the target class symbols share many features with the reference class symbols based on the similarities of the images in each output pair, and, therefore, are hard to for a neural network (NN), such as the neural network of an autoencoder, to distinguish.

Figure 9:
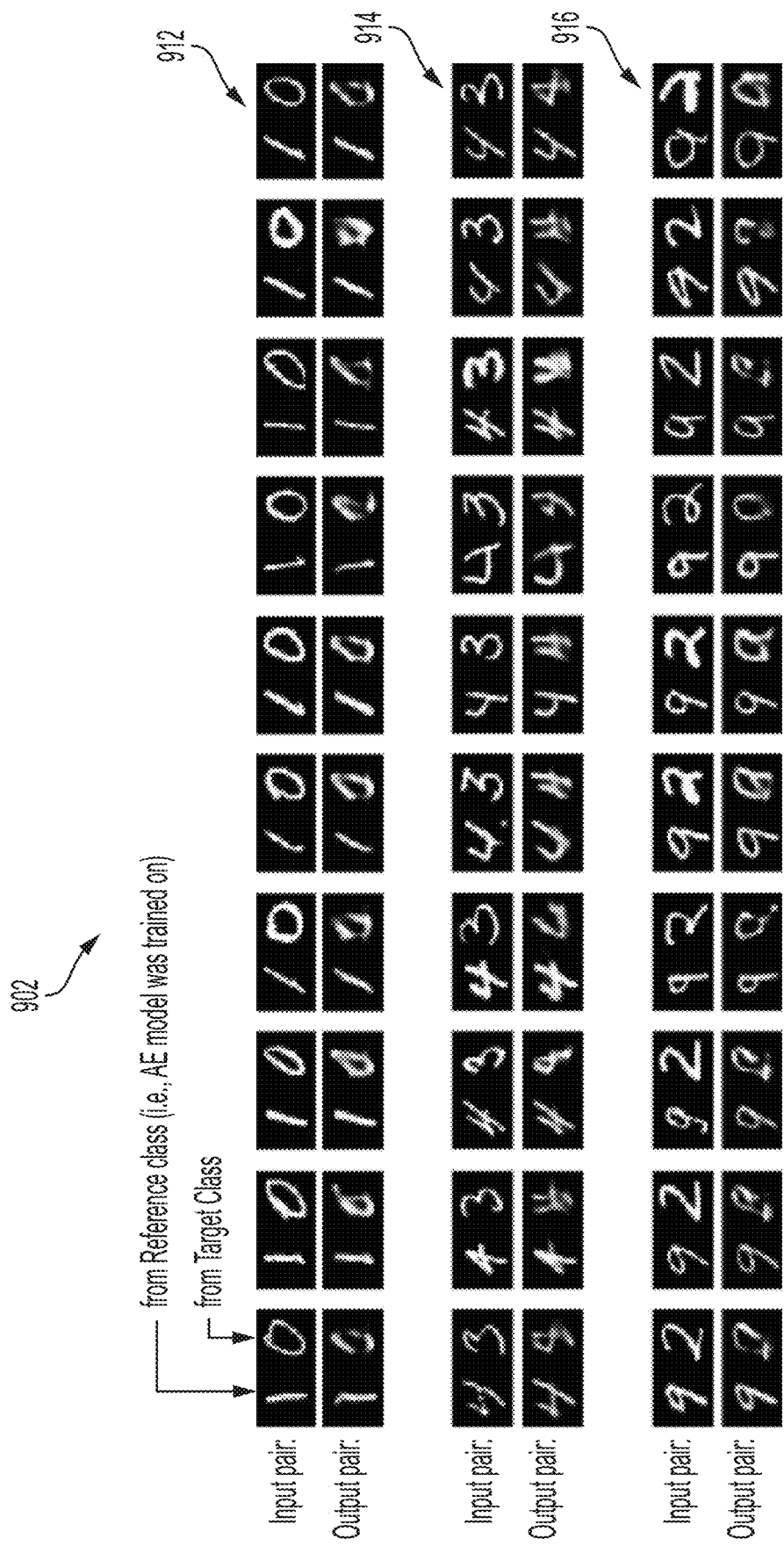
FIG. 9 depicts a diagram illustrating input pairs of images and output pairs of images for a reference class of symbols and a target class of symbols for an autoencoder where the target class of symbols has a low similarity with the reference class of datasets according to an embodiment of the present invention.

FIG. 9 depicts a diagram 902 illustrating input pairs of images and output pairs of images for a reference class of symbols and a target class of symbols for an autoencoder using a process similar to process 740 of FIG. 7 where the target class of symbols has a low similarity with the reference class of datasets according to an embodiment of the present invention. Example 912 of diagram 902 shows input pairs (sets) of images for an autoencoder where the reference class is images of handwritten 1's and the target class is images of handwritten 0's. Example 914 of diagram 902 shows input pairs (sets) of images for an autoencoder where the reference class is images of handwritten 4's and the target class is images of handwritten 3's. Example 916 of diagram 902 shows input pairs (sets) of images for an autoencoder where the reference class is images of handwritten 9's and the target class is images of handwritten 2's. The interpretation of examples 912, 914 and 916 is that the target class symbols share few features with the reference class symbols based on the similarities of the images in each output pair, and, therefore, are easy for a neural network (NN), such as the neural network of an autoencoder, to distinguish.

Figure 10:
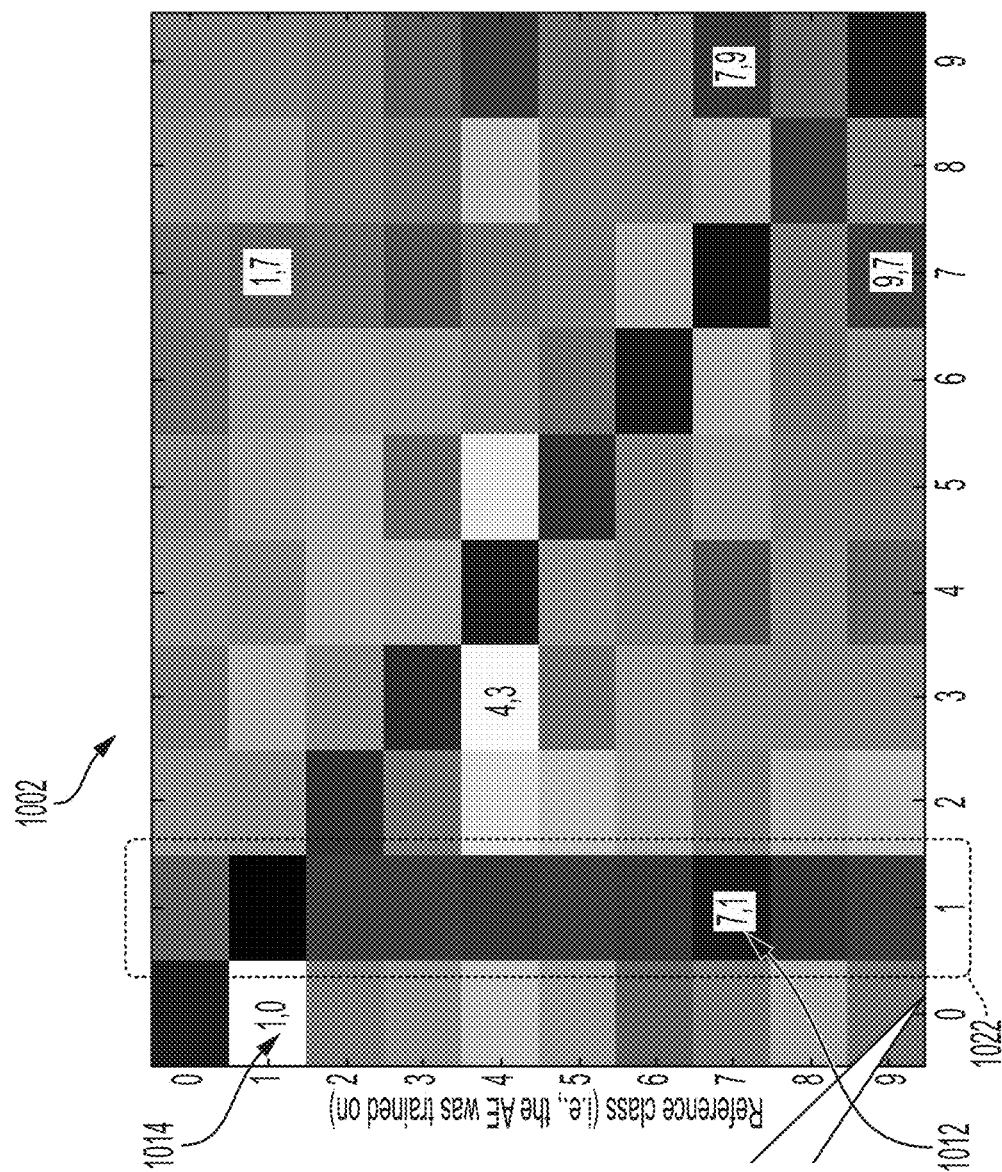
FIG. 10 depicts a confusion matrix for a set of reference classes and a set of target classes for a dataset according to an embodiment of the present invention.

FIG. 10 depicts a confusion matrix 1002 for a set of reference classes and a set of target classes for a dataset according to an embodiment of the present invention. Darker boxes in confusion matrix 1002, such as box 1012 where the reference class 7 and the target class is class 1, indicate that the target class and reference class are more similar, i.e., confusing for a neural network, such as the neural network of an autoencoder. Brighter boxes in confusion matrix 1002, such as box 1014 where the reference class is class 1 and the target class is class 0, indicate that the target class and reference class are less similar, i.e., less confusing for a neural network, such as the neural network of an autoencoder. The column of confusion matrix 1002 for target class 1 is shown in a dashed circle 1022. Because all of the boxes in the column for target class 1 are at least relatively dark, this indicates that input samples from class 1 may be reconstructed relatively well using autoencoders trained using other reference classes and may indicates that class 1 is made of a universal feature inherent in many other classes of the dataset.

Figure 11:
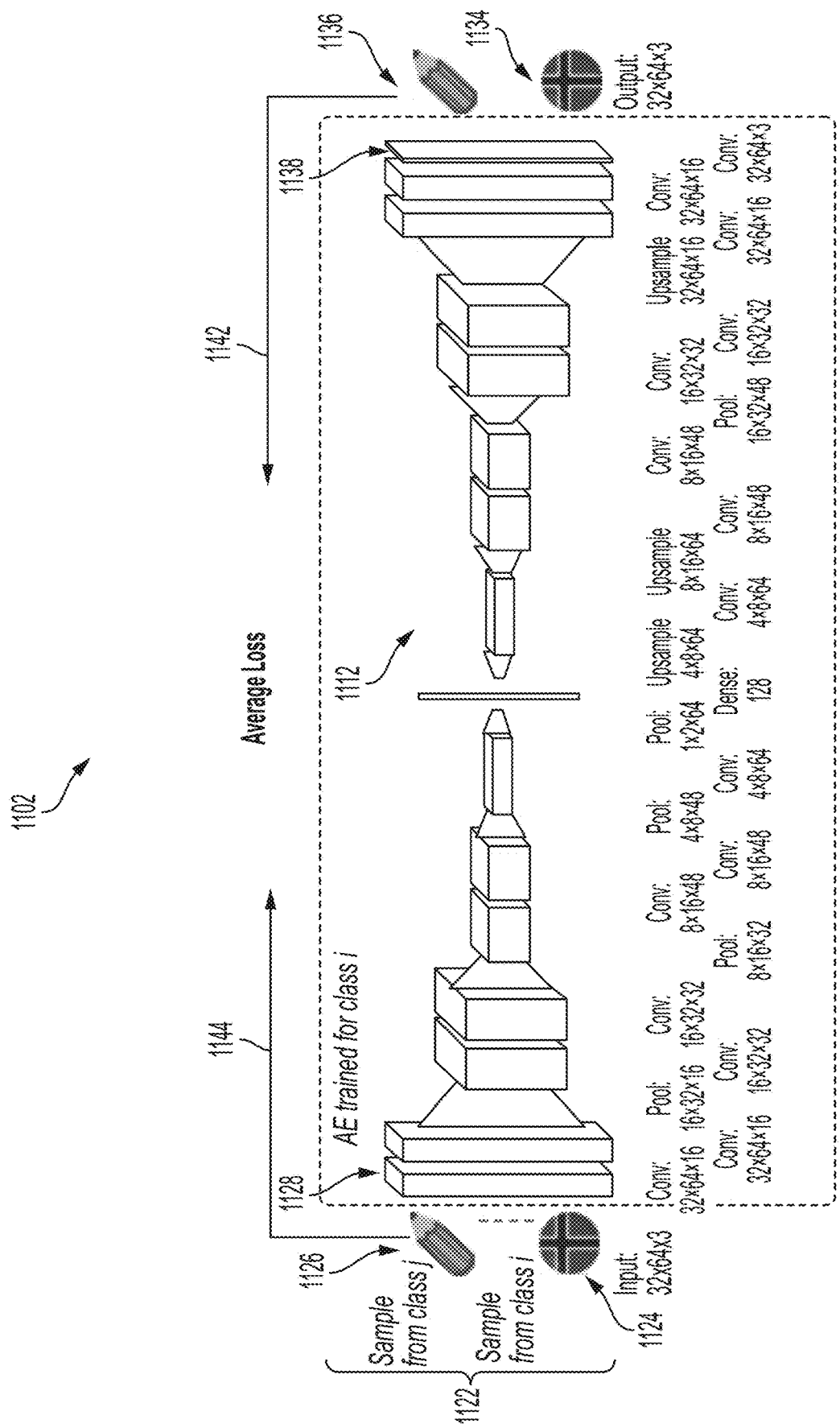
FIG. 11 depicts a diagram illustrating end-to-end data similarity extraction for two classes of a dataset of icons according to an embodiment of the present invention.

FIG. 11 depicts a diagram illustrating end-to-end data similarity extraction for two classes of a dataset of icons according to an embodiment of the present invention. FIG. 11 shows an embodiment of an autoencoder taking two input images at the input layer, and reconstructing two output images at the output layer. In FIG. 11, an autoencoder 1112 has been trained with reference samples from class i, images of symbols for flags, of a dataset of icons (not shown in FIG. 11). FIG. 11 shows an input pair 1122 of input samples comprising a reference input sample 1124 from class i and a target input sample 1126 from class j, images of symbols for writing utensils, of the dataset of icons. Autoencoder 1112 takes reference input sample 1124 and target input sample 1126 at an input layer 1128 and reconstructs reference input sample 1124 and target input sample 1126 as reconstructed reference output 1134 and reconstructed target output 1136, respectively, at output layer 1138. As shown by arrows 1142 and 1144, the similarity of class j to class i is determined by comparing the similarity of reconstructed target output 1136 to target input sample 1126 and determining the similarity between reconstructed target output 1136 to target input sample 1126 by an average loss between reconstructed target output 1136 and target input sample 1126 or any other suitable technique for determining the similarity between reconstructed target output 1136 and target input sample 1126

Figure 12:
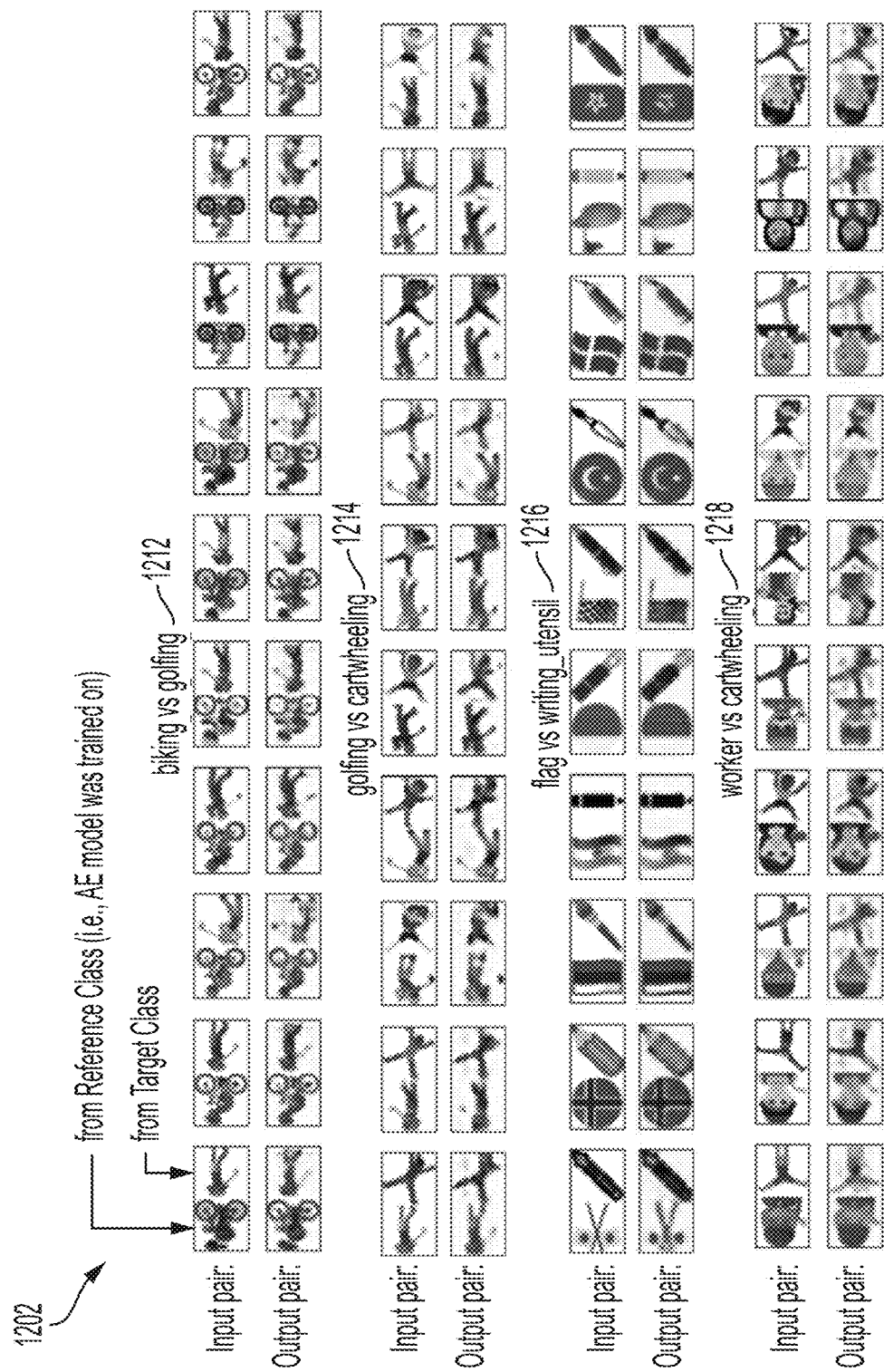
FIG. 12 depicts a diagram illustrating input pairs of images and output pairs of images for a reference class of symbols and a target class of symbols for an autoencoder where the target class of symbols has a high similarity with the reference class for a dataset according to an embodiment of the present invention.

FIG. 12 shows a diagram 1202 illustrating input pairs of images and output pairs of images for a reference class of symbols and a target class of symbols for an autoencoder using a process similar to process 740 of FIG. 7 where the target class of symbols has a high similarity with the reference class of a dataset according to an embodiment of the present invention. Example 1212 of diagram 1202 shows input pairs (sets) of images for an autoencoder where the reference class is images of symbols for a person biking and the target class is images of symbols for a person golfing. Example 1214 of diagram 1202 shows input pairs (sets) of images for an autoencoder where the reference class is images of a symbols for a person golfing and the target class is images of symbols for a person cartwheeling. Example 1216 of diagram 1202 shows input pairs (sets) of images for an autoencoder where the reference class is images of symbols for flags and the target class is images of symbols for writing utensils. Example 1218 of diagram 1202 shows input pairs (sets) of images for an autoencoder where the reference class is images of symbols for worker and the target class is images of symbols for a person cartwheeling. The interpretation of examples 1212, 1214, 1216 and 1218 is that the target class symbols share many features with the reference class symbols based on the similarities of the images in each output pair, and, therefore, are hard to for a neural network (NN), such as the neural network of an autoencoder, to distinguish.

Figure 13:
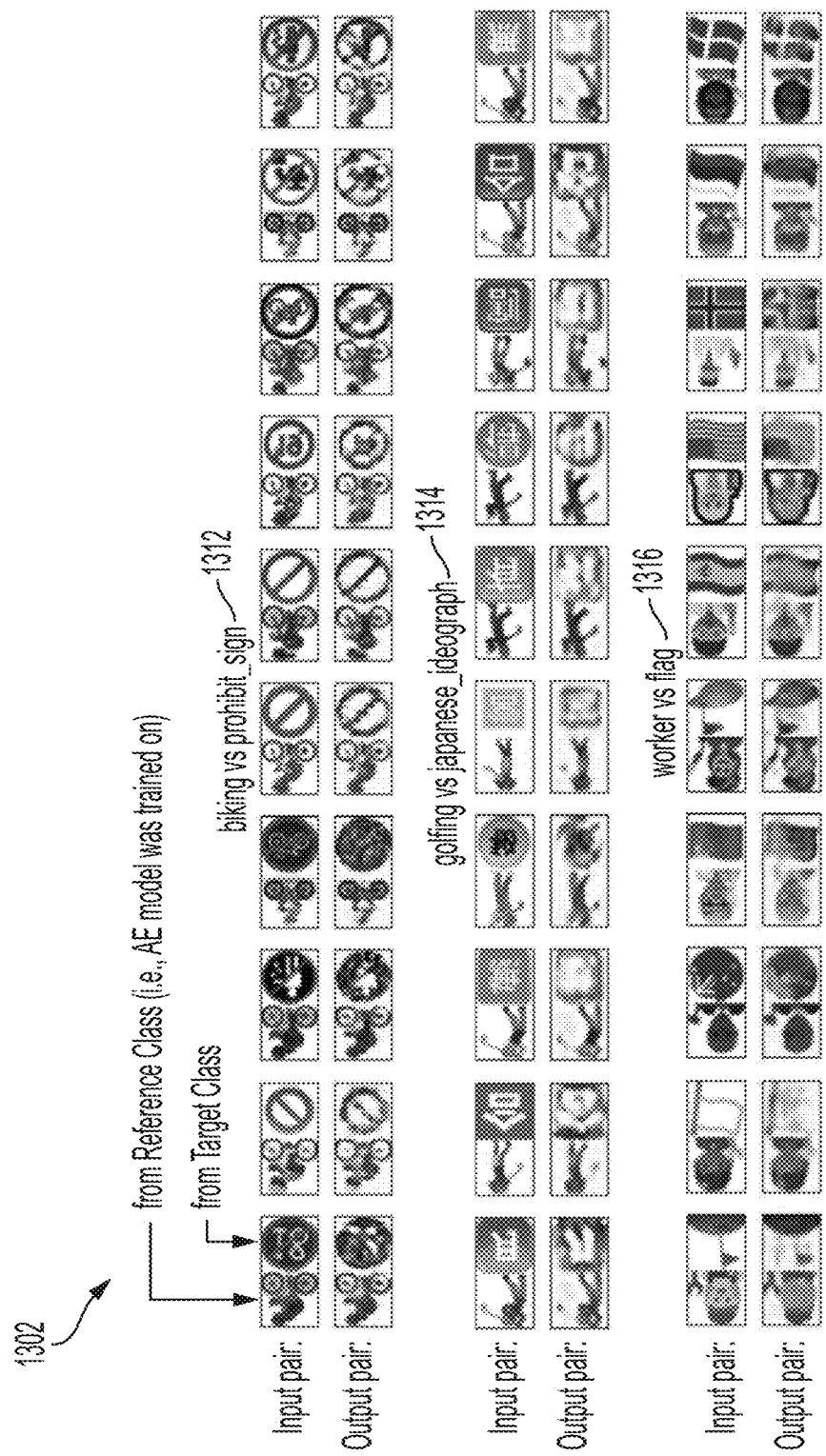
FIG. 13 depicts a diagram illustrating input pairs of images and output pairs of images for a reference class of symbols and a target class of symbols for an autoencoder where the target class of symbols has a low similarity with the reference class of datasets according to an embodiment of the present invention.

FIG. 13 depicts a diagram 1302 illustrating input pairs of images and output pairs of images for a reference class of symbols and a target class of symbols for an autoencoder using a process similar to process 740 of FIG. 7 where the target class of symbols has a low similarity with the reference class of a dataset according to an embodiment of the present invention. Example 1312 of diagram 1302 shows input pairs (sets) of images for an autoencoder where the reference class is images of symbols for a person biking and the target class is images of prohibit signs. Example 1314 of diagram 1302 shows input pairs (sets) of images for an autoencoder where the reference class is images of symbols for golfing and the target class is images of ideographs. Example 1316 of diagram 1302 shows input pairs (sets) of images for an autoencoder where the reference class is images of symbols for workers and the target class is images of symbols for flags. The interpretation of examples 1312, 1314 and 1316 is that the target class symbols share few features with the reference class symbols based on the similarities of the images in each output pair, and, therefore, are easy for a neural network (NN), such as the neural network of an autoencoder, to distinguish.

Figure 14:
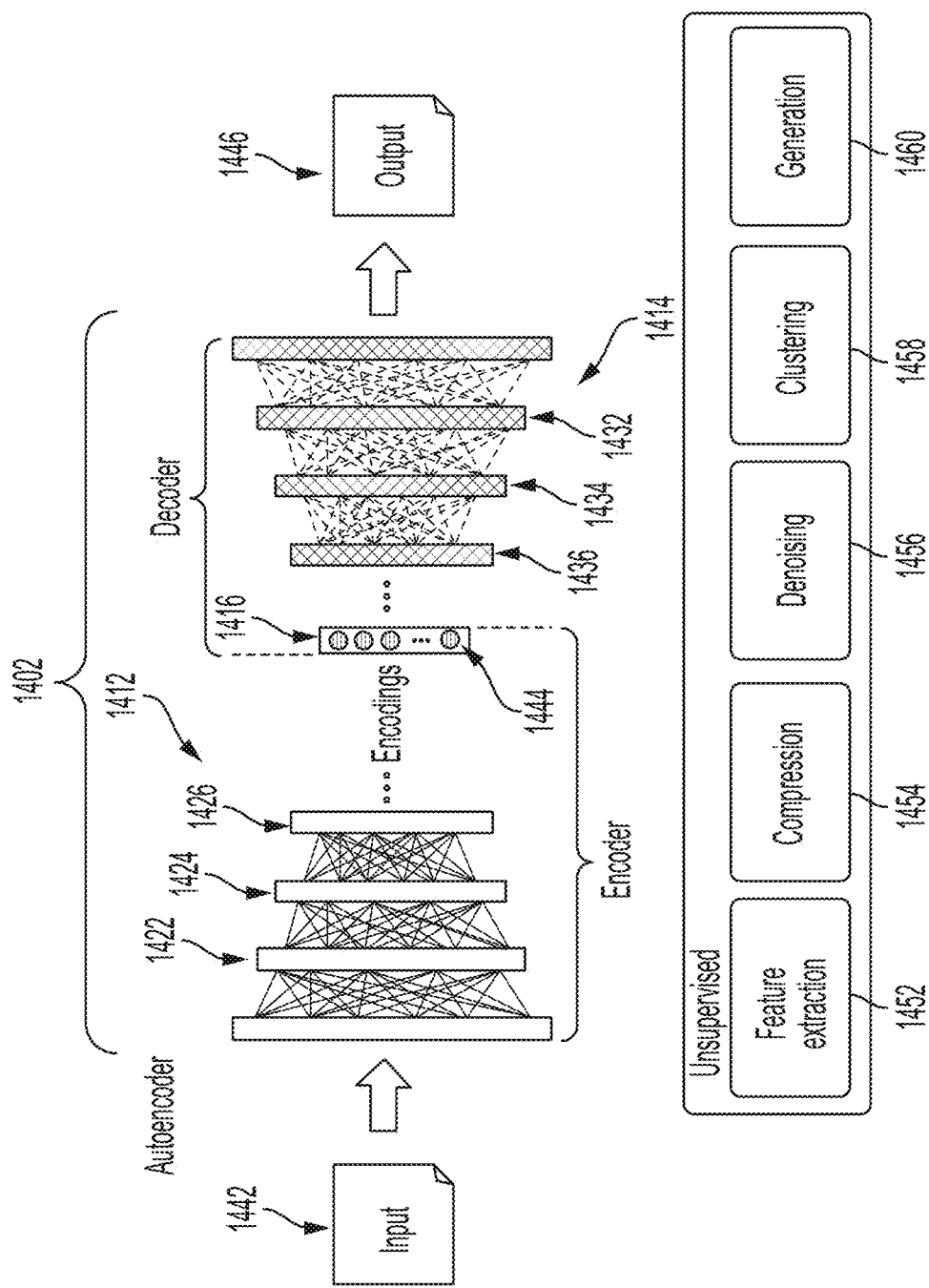
FIG. 14 depicts an autoencoder in simplified form according to an embodiment of the present invention.

FIG. 14 depicts an autoencoder 1402 according to an embodiment of the present invention. Autoencoder 1402 includes an encoder 1412, a decoder 1414 and encodings 1416. Encoder 1412 includes hidden layers 1422, 1424 and 1426. Decoder 1414 includes hidden layers 1432, 1434 and 1436. An input 1442, such as a sample of a dataset, is input into encoder 1412. Encoder 1412 encodes input 1442 into an encoding 1444 of encodings 1416. Encoding 1444 is decoded, i.e., reconstructed, by decoder 1414 to produce an output 1446. As indicated by boxes 1452, 1454, 1456, 1458 and 1460, respectively, common applications of an autoencoder include feature extraction, compression, denoising, clustering and generation. Although 3 hidden layers are shown in the autoencoder shown in FIG. 14, autoencoders used in various embodiments of the present invention can have different numbers of hidden layers.

An autoencoder, such as autoencoder 1402 is a type of artificial neural network that may be used to learn efficient data codings in an unsupervised manner. An aim of an autoencoder is to learn a representation, i.e., an encoding, for a dataset, typically for dimensionality reduction, by training the neural network of the autoencoder to ignore signal "noise." Along with the reduction side, a reconstructing side is learnt, where the autoencoder tries to generate from the reduced encoding a representation as close as possible to its original input.

Although embodiments of the present invention used with respect to datasets of images are primarily described above and shown in the drawings, various embodiments of the present invention may be used with other types of datasets such as, but not limited to: datasets of utterances or speech, datasets of nonverbal sound samples, datasets of logs of a computer system, or datasets of protein sequences, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
inputting into an autoencoder one or more sets of input samples, with each of the one or more sets of input samples including: a reference input sample of a reference dataset and one or more target input samples of one or more target datasets, with the one or more target datasets including a class, the autoencoder being trained using the reference dataset;
for each set of input samples:
encoding by the autoencoder a latent space representation of the reference input sample based on the reference input sample;
reconstructing by the autoencoder the latent space representation of the reference input sample to generate a reference output;
encoding by the autoencoder a latent space representation of each target input sample of the one or more target input samples based on the one or more target input samples; and
reconstructing by the autoencoder the latent space representation of each of the one or more target input samples to generate one or more target outputs;
generating by the autoencoder a respective set of outputs for each set of the one or more sets of input samples to form one or more respective sets of outputs, with each of the one or more respective sets of outputs including the reference output and the one or more target outputs for a respective set of input samples;
determining a similarity of each of the one or more target datasets to the reference dataset by comparing each of the one or more target outputs of each of the one or more respective sets of outputs to respective target inputs for each set of the one or more sets of input samples, with the comparison of the one or more target outputs of each of the one or more respective sets of outputs to respective target inputs for each set of the one or more sets of inputs samples including the utilization of a first quantitative similarity measurement technique to determine a quantitative similarity between the one or more target datasets to the reference dataset; and determining whether the class of the one or more target datasets needs to be supplemented with compatible samples from a stock dataset.

2. The computer-implemented method of claim 1, wherein the one or more sets of input samples each includes the reference sample of the reference dataset and a target sample of a target data set.

3. The computer-implemented method of claim 1, wherein the reference dataset and the one or more target datasets are different classes of the same dataset.

4. The computer-implemented method of claim 1, wherein the reference dataset is a dataset of reference image samples and each of the one or more target datasets is a dataset of target image samples, the reconstructing of one or more target image input samples generating one or more target image outputs.

5. The computer-implemented method of claim 4, wherein determining the similarity of each of the one or more target datasets to the reference dataset by comparing each of the one or more target outputs of each of the one or more respective sets of outputs to respective target inputs for each set of the one or more sets of input samples is achieved by:

making a pixel by pixel comparison of each of the one or more target image outputs of each of the one or more respective sets of image outputs to respective target image inputs for each set of the one or more sets of image input samples.

6. The computer-implemented method of claim 4, wherein the reference dataset is a dataset of reference image samples of handwritten characters and each of the one or more target datasets is a dataset of target image samples of handwritten characters.

7. The computer-implemented method of claim 4, wherein the reference dataset is a dataset of reference image samples of symbols and the one or more target datasets are each a dataset of target image samples of symbols.

8. The computer-implemented method of claim 1, wherein the reference dataset is a dataset of reference speech samples and the one or more target datasets are each a dataset of target speech samples.

9. A system comprising one or more processors and one or more computer readable storage devices and program instructions stored on the one or more computer readable storage devices, and with the one or more processors executing the program instructions stored on the one or more computer readable storage devices, the stored program instructions comprising:

inputting into an autoencoder one or more sets of input samples, with each of the one or more sets of input samples including: a reference input sample of a reference dataset and one or more target input samples of one or more target datasets, with the one or more target datasets including a class, the autoencoder being trained using the reference dataset;

for each set of input samples:

encoding by the autoencoder a latent space representation of the reference input sample based on the reference input sample;

reconstructing by the autoencoder the latent space representation of the reference input sample to generate a reference output;

encoding by the autoencoder a latent space representation of each target input sample of the one or more target input samples based on the one or more target input samples; and reconstructing by the autoencoder the latent space representation of each of the one or more target input samples to generate one or more target outputs;

generating, by the autoencoder, a respective set of outputs for each set of the one or more sets of input samples to form one or more respective sets of outputs, with each of the one or more respective sets of outputs including the reference output and the one or more target outputs for a respective set of input samples;

determining a similarity of each of the one or more target datasets to the reference dataset by comparing each of the one or more target outputs of each of the one or more respective sets of outputs to respective target inputs for each set of the one or more sets of input samples, with the comparison of the one or more target outputs of each of the one or more respective sets of outputs to respective target inputs for each set of the one or more sets of inputs samples including the utilization of a first quantitative similarity measurement technique to determine a quantitative similarity between the one or more target datasets to the reference dataset;

determining whether the class of the one or more target datasets needs to be supplemented with compatible samples from a stock dataset.

10. The system of claim 9, wherein the one or more sets of input samples each includes the reference sample of the reference dataset and a target sample of a target data set.

11. The system of claim 9, wherein the reference dataset and the one or more target dataset are different classes of the same dataset.

12. The system of claim 9, wherein the reference dataset is a dataset of reference image samples and the one or more target datasets are each a dataset of target image samples, the reconstructing of one or more target image input samples generating one or more target image outputs.

13. The system of claim 12, wherein determining the similarity of each of the one or more target datasets to the reference dataset by comparing each of the one or more target outputs of each of the one or more respective sets of outputs to respective target inputs for each set of the one or more sets of input samples is achieved by:

making a pixel by pixel comparison of each of the one or more target image outputs of each of the one or more respective sets of image outputs to respective target image inputs for each set of the one or more sets of image input samples.

14. The system of claim 12, wherein the reference dataset is a dataset of reference image samples of handwritten characters and each of the one or more target datasets is a dataset of target image samples of handwritten characters.

15. A computer program product comprising one or more computer readable storage devices and program instructions stored on the one or more computer readable storage devices, and with one or more processors executing the program instructions stored on the one or more computer readable storage devices, the stored program instructions comprising:

inputting into an autoencoder one or more sets of input samples, with each of the one or more sets of input samples including: a reference input sample of a reference dataset and one or more target input samples of one or more target datasets, with the one or more target datasets including a class, the autoencoder being trained using the reference dataset;

for each set of input samples:

encoding by the autoencoder a latent space representation of the reference input sample based on the reference input sample;

reconstructing by the autoencoder the latent space representation of the reference input sample to generate a reference output;

encoding by the autoencoder a latent space representation of each target input sample of the one or more target input samples based on the one or more target input samples; and reconstructing by the autoencoder the latent space representation of each of the one or more target input samples to generate one or more target outputs;

generating, by the autoencoder, a respective set of outputs for each set of the one or more sets of input samples to form one or more respective sets of outputs, with each of the one or more respective sets of outputs including the reference output and the one or more target outputs for a respective set of input samples;

determining a similarity of each of the one or more target datasets to the reference dataset by comparing each of the one or more target outputs of e ach of the one or more respective sets of outputs to respective target inputs for each set of the one or more sets of input samples, with the comparison of the one or more target outputs of each of the one or more respective sets of outputs to respective target inputs for each set of the one or more sets of inputs samples including the utilization of a first quantitative similarity measurement technique to determine a quantitative similarity between the one or more target datasets to the reference dataset; and determining whether the class of the one or more target datasets needs to be supplemented with compatible samples from a stock dataset.

16. The computer program product of claim 15, wherein the one or more sets of input samples each includes the reference sample of the reference dataset and a target sample of a target data set.

17. The computer program product of claim 15, wherein the reference dataset and the one or more target datasets are different classes of the same dataset.

18. The computer program product of claim 15, wherein the reference dataset is a dataset of reference image samples and the one or more target datasets are each a dataset of target image samples, the reconstructing of one or more target image input samples generating one or more target image outputs.

19. The computer program product of claim 18, wherein determining the similarity of each of the one or more target datasets to the reference dataset by comparing each of the one or more target outputs of each of the one or more respective sets of outputs to respective target inputs for each set of the one or more sets of input samples is achieved by:

making a pixel by pixel comparison of each of the one or more target image outputs of each of the one or more respective sets of image outputs to respective target image inputs for each set of the one or more sets of image input samples.

20. The computer program product of claim 18, wherein the reference dataset is a dataset of reference image samples of handwritten characters and each of the one or more target datasets is a dataset of target image samples of handwritten characters.

\* \* \* \* \*